(12) United States Patent
Petrov et al.

(10) Patent No.: US 7,233,008 B1
(45) Date of Patent: Jun. 19, 2007

(54) MULTIPLE ELECTRODE LENS ARRANGEMENT AND A METHOD FOR INSPECTING AN OBJECT

(75) Inventors: Igor Petrov, Holon (IL); Dror Shemesh, Hod Hasharon (IL)

(73) Assignee: Applied Materials, Israel, Ltd., Rehovot (IL)

( * ) Notice: Subject to any disclaimer, the term of this patent is extended or adjusted under 35 U.S.C. 154(b) by 0 days.

(21) Appl. No.: 11/080,036

(22) Filed: Mar. 14, 2005

(51) Int. Cl.
*G03B 27/54* (2006.01)
*G03B 27/42* (2006.01)

(52) U.S. Cl. .......................... 250/396 ML; 250/396 R (58) Field of Classification Search ......... 250/396 ML
See application file for complete search history.

(56) References Cited

U.S. PATENT DOCUMENTS

| | | | | |
|---|---|---|---|---|
| 4,926,054 A | * | 5/1990 | Frosien | 250/396 R |
| 6,674,075 B2 | * | 1/2004 | Petrov et al. | 250/310 |
| 6,825,475 B2 | * | 11/2004 | Petrov et al. | 250/396 ML |
| 6,897,442 B2 | * | 5/2005 | Petrov | 250/310 |
| 7,034,297 B2 | * | 4/2006 | Petrov et al. | 250/310 |
| 7,067,807 B2 | * | 6/2006 | Petrov et al. | 250/307 |
| 7,112,803 B2 | * | 9/2006 | Petrov et al. | 250/396 R |

* cited by examiner

*Primary Examiner*—David Vanore
(74) *Attorney, Agent, or Firm*—Tarek N. Fahmi (57) ABSTRACT

A inspection system includes: a lens arrangement adapted to generate a substantially symmetrical electrostatic field about an optical axis and to direct a primary electron beam towards an object that is oriented in relation to the optical axis at a non-normal angle; and at least on additional electrode, positioned outside the lens arrangement such as to increase symmetry of an electromagnetic field in the vicinity of an interaction point between the primary electron beam and the object. A method for inspecting an object includes: passing a primary electron beam, along an optical axis, through a substantially symmetrical electrostatic field defined within an electron lens arrangement; and propagating the primary electron beam from the lens arrangement towards an interaction point with an object that is oriented in relation to the optical axis at a non-normal angle, while maintaining, by at least one additional electrode positioned outside the lens arrangement, a substantially symmetrical electrical field in a vicinity of the interaction point.

22 Claims, 8 Drawing Sheets

FIGURE 6 passing a primary electron beam, along an optical axis, through a
substantially symmetrical electrostatic field defined within an electron lens
310 propagating the primary electron beam from the lens arrangement towards an
interaction point with an object that is oriented in relation to the optical axis
at a non-normal angle, while maintaining, by at least one additional
electrode positioned outside the lens arrangement, a substantially
symmetrical electrical field in a vicinity of the interaction point.
320 collecting secondary electrons by at least one detector
330 processing detected electrodes in order to detect defects, measure features,
and the like
340

300

FIGURE 7 passing a primary electron beam, along an optical axis, through a substantially symmetrical electrostatic field defined within an electron lens.
410 propagating the primary electron beam from the lens arrangement towards an interaction point with an object that is oriented in relation to the optical axis at a non-normal angle, while affecting, by at least one additional electrode positioned outside the lens arrangement opposite an upper part of the object, an electrostatic field in a vicinity of the interaction point
420 collecting secondary electrons by at least one detector
440 processing detected electrodes in order to detect defects, measure features, and the like
440

MULTIPLE ELECTRODE LENS ARRANGEMENT AND A METHOD FOR INSPECTING AN OBJECT

FIELD OF THE INVENTION

The present invention is in the field of inspection/measurement techniques of the kind utilizing irradiation of an object by a focused beam of electrically charged particles, such as electrons, positrons, or ions, and relates to an lens arrangement for use in a charged particle beam column.

BACKGROUND OF THE INVENTION

Charged particle beam columns are typically employed in scanning electron microscopy (SEM), which is a known technique widely used in the manufacture of semiconductor devices, being utilized in CD metrology tools, the so-called CD-SEM (Critical Dimension Scanning Electron Microscope) and defect review SEM (DR-SEM). In an SEM, the region of an object to be examined is two-dimensionally scanned by means of a focused primary beam of electrically charged particles, usually electrons. Irradiation of the object with the primary electron beam releases secondary (and/or backscattered) electrons. The secondary electrons are released at that side of the object at which the primary electron beam is incident, and move back to be captured by a detector, which generates an output electrical signal proportional to the so-detected electric current. The energy and/or the energy distribution of the secondary electrons is indicative of the nature and composition of the object.

The inspection of an object with a DR-SEM requires a certain, relatively high tilt (as compared to that required for CD-measurements) of the object's surface with respect to the incident electron beam (e.g., 45 degree angle of incidence). When inspecting patterned objects, such as semiconductor wafers, having a pattern in the form of a plurality of spaced-apart grooves, tilting of the object is needed to detect the existence of a foreign particle located inside a narrow groove.

It is known to implement a tilt mechanism by either mechanically tilting the object's carrier with respect to the charged particle beam column or tilting the column with respect to the object's carrier, or both (e.g., U.S. Pat. Nos. 5,329,125; 5,734,164; 5,894,124; 6,037,589). It is also known to achieve a tilt by affecting the trajectory of the primary electron beam using single- or double-deflection, the so-called "electronic tilt" (e.g., WO 01/45136 and U.S. Pat. No. 6,380,54, assigned to the assignee of the present application).

One of the common goals of all imaging systems consists of increasing the image resolution. In SEM, in order to reduce the "spot" size of the electron beam up to nanometers, a highly accelerated electron beam is typically produced using accelerating voltages of several tens of kilovolts and more. Specifically, the electron optical elements are more effective (i.e. produce smaller aberrations) when the electrons are accelerated to high kinetic energy. However, it has been observed that such a highly energized electron beam causes damage to resist structures and integrated circuits, and, in the case of dielectric specimens, causes undesirable charging of the specimen. Therefore, the primary electron beam is decelerated just prior to impinging onto the object by an electric field created in the vicinity of the object. This electric field, while decelerating the primary electrons, accelerates secondary electrons released at the object.

The above can be implemented by using an lens arrangement in the form of a combination of a magnetic lens arrangement and an electrostatic lens (e.g., WO 01/45136, EP 1045425, U.S. Pat. No. 6,380,546, all assigned to the assignee of the present application, and WO 01/5056). The electrostatic part of such a compound magnetic-electrostatic lens is an electrostatic retarding lens (with respect to the primary charged particle beam), which has two electrodes held at different potentials, one of the two electrodes being formed by a cylindrical anode tube that defines a beam drift space and arranged within a magnetic lens arrangement along its optical axis, and the other electrode being a metallic cup provided below the magnetic lens arrangement. Generally, the electrostatic part of the lens arrangement may not be implemented as a separate electrostatic lens, but rather by applying appropriate voltages to the anode tube and the object, or to the anode tube, the polepiece of the magnetic lens arrangement and the object.

The operation with low primary beam energies (less than 1 keV), especially in large mechanical tilts (e.g., 45 degrees), limits the system resolution due to high chromatic aberration of the electrostatic part of the lens arrangement, namely, the distribution of the electrostatic field in the vicinity of the object. Due to the variance in energy, the primary beam particles are typically dispersed into beam components formed by, respectively, particles of average energy, particles of relatively high-energy, and particles of relatively low-energy. The high-energy particles are less diffracted than the low-energy particles. This difference causes the enlargement of the diameter of the charged particle beam, and consequently, the reduction of resolution. This is also referred to as chromatic aberrations of focusing. The low-energy beam is characterized by more expressed chromatic aberrations than the high-energy beam.

U.S. Pat. No. 2,001,0011702 discloses a technique of observing semiconductor wafers with higher resolution at a low acceleration voltage, in particular, when a wafer is inclined or tilted at large angles. This technique utilizes a composite lens consisting essentially of a single-pole or monopole magnetic field type lens and an electrostatic field invasive lens, whereas an electrode of the electrostatic field invasive lens which opposes the wafer is made of a magnetic material while letting a high voltage of the negative polarity be applied to this electrode and the wafer.

SUMMARY OF THE INVENTION

An inspection system that includes: (i) a lens arrangement adapted to generate a substantially symmetrical electrostatic field about an optical axis and to direct a primary electron beam towards an object that is oriented in relation to the optical axis at a non-normal angle; and (ii) at least one additional electrode, positioned outside the lens arrangement such as to increase the symmetry of an electromagnetic field at the vicinity of an interaction point between the primary electron beam and the object.

An inspection system that includes: (i) a lens arrangement adapted to direct a primary electron beam towards an object that is oriented in relation to the optical axis of the inspection system at a non-normal angle; and (ii) at least one additional electrode, positioned outside the lens arrangement and opposite an upper part of the object.

A method for inspecting an object, the method includes: (i) passing a primary electron beam, along an optical axis, through a substantially symmetrical electrostatic field defined within an electron lens; and (ii) propagating the primary electron beam from the lens arrangement towards an interaction point with an object that is oriented in relation to the optical axis at a non-normal angle, while maintaining, by at least one additional electrode positioned outside the lens arrangement, a substantially symmetrical electrical field in a vicinity of the interaction point.

A method for inspecting an object, the method includes: (i) passing a primary electron beam, along an optical axis, through a substantially symmetrical electrostatic field defined within an electron lens; and (ii) propagating the primary electron beam from the lens arrangement towards an interaction point with an object that is oriented in relation to the optical axis at a non-normal angle, while affecting, by at least one additional electrode positioned outside the lens arrangement opposite an upper part of the object, an electrostatic field at a vicinity of the interaction point.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

There is a need in the art to facilitate the monitoring of objects with a charged particle beam, by providing a novel lens arrangement for use in a charged particle beam column. Here, the term "monitoring" signifies at least one of the inspection and measurement techniques.

The term "primary beam" used herein (being also referred to as "primary charged particle beam" or "primary electron beam") signifies a charged particle beam, which is formed by charged particles generated by a source (cathode) of these particles, and which is to be directed to an object to release charged particles forming a "secondary beam" (also referred to as "secondary charged particle beam" or secondary electron beam), which is to be detected.

The present invention is aimed at solving a problem of improving the resolution in a DR-SEM column, especially for low primary beam energies (less than 1 keV), for operation with large angles of primary beam incidence (e.g., 45 degrees) by using one or more additional electrodes that increase the symmetry of the electrostatic field at the vicinity of the inspected article.

FIGS. 1–6 illustrate a portion of an inspection system that includes a lens arrangement adapted to direct a primary electron beam towards an object that is oriented in relation to the optical axis at a non-normal angle; and at least one additional electrode, positioned outside the lens arrangement and opposite an upper part of the object. It is noted that the lens arrangement can differ from that of lens arrangement 10 of FIGS. 1–6 and that the shape and position, as well as the number of additional electrodes can differ from those illustrated in FIGS. 1–6.

FIGS. 1–6 illustrate a portion of an inspection system that includes a lens arrangement adapted to generate a substantially symmetrical electrostatic field about an optical axis and to direct a primary electron beam towards an object that is oriented in relation to the optical axis at a non-normal angle; and at least one additional electrode, positioned outside the lens arrangement such as to increase the symmetry of an electromagnetic field in the vicinity of an interaction point between the primary electron beam and the object. It is noted that the lens arrangement can differ from that of lens arrangement 10 of FIGS. 1–6 and that the shape and position, as well as the number of additional electrodes can differ from those illustrated in FIGS. 1–6.

The SEM usually includes components that allow altering the cross section of the primary electron beam. One typical component is a stigmator that includes multiple coils that can be fed by different supply voltages and creates an electrostatic field that affects the cross section of the electron beam. The inventors used a stigmator that included two rings of four coils each wherein the coils of the first ring were rotated at 45° in relation to the coils of the second ring. By applying various voltages to the rings the SEM can compensate for various aberrations that occur in the presence of one or more additional electrodes.

Figure 1:
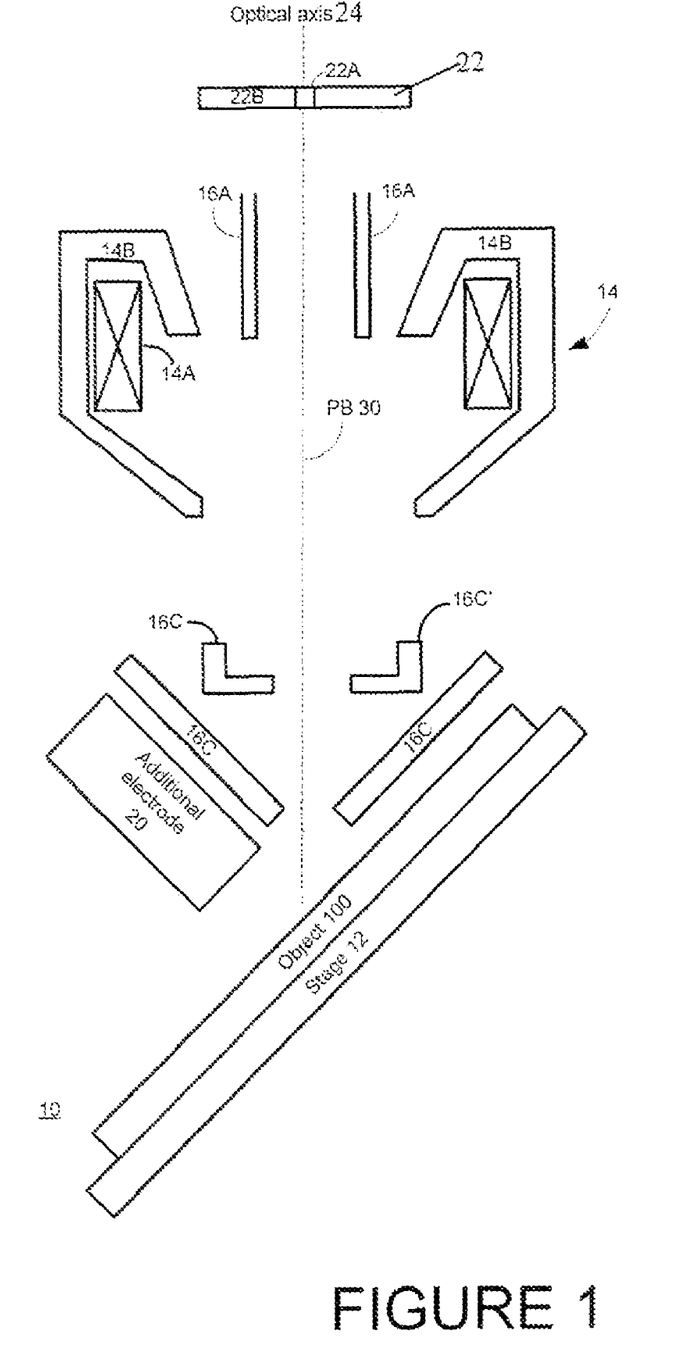
FIG. 1 illustrates a lens arrangement and an additional electrode, according to an embodiment of the invention.

FIG. 1 illustrates a lens arrangement 10 and an additional electrode 20, according to an embodiment of the invention. Conveniently, they are a part of a scanning electron microscope. FIG. 1 illustrates a lens arrangement 10, an in-lens detector 22 and at least one external electrode, such as external electrode 20. The SEM inspects an object 100 that is held by stage 12 at an angle of 45° in relation to an imaginary horizon.

The lens arrangement 10 includes a magnetic lens 14 (including elements 14A and 14B) and an electrostatic lens (including elements 16A, 16C and 16C'). The in lens detector 22 includes at least one plate such as 22B that defines an opening 22A through which the primary electron beam PB 30 can propagate.

The primary electron beam PB 30 propagates through a space within the lens arrangement 10, along an optical axis, such as optical axis 24 that is normal to the imaginary horizon.

The magnetic lens 14 is formed by excitation coils 14A and two pole pieces 14B. The electrostatic lens is formed by following electrodes: electrode 16A—the lower end of an anode tube, an electrode which is defined by the surface of the object 100, and "cap" electrodes 16C and 16C' arranged in a spaced-apart relationship along the optical axis 24 of the lens arrangement 10 between the electrodes 16A and object 100. The electrodes 16C and 16C' are separately operated by a voltage supply (not shown), and are preferably made of mu-metal for better magnetic immunity (less noise). In order to affect the charged particle beam trajectory (deflection) for example for fast scan purposes, the electrode 16C' can be designed as a multiple-electrode structure, such as a dipole, quadruple, or octupole structure. At least the lower electrode 16C of the double-electrode assembly is preferably conically shaped. This is associated with a need for as small as possible "effective" working distance (which is a distance between the plane defined by the lowermost electrode of the lens arrangement and the object plane measured along the optical axis 24) when operating with a tilted object. As shown in FIG. 1, when object 100 is tilted, it is substantially parallel to the right electrode 16C and the additional electrode 20 is substantially parallel to the left electrode 16C.

In the present example, a 45° tilt (an angle between the optical axis 24 and the object's plane) is achieved by mechanically tilting the object with respect to the lens arrangement 10. It should, however, be understood that the same can be achieved by tilting the lens arrangement (or the entire column) with respect to the object. It is further noted that other tilt angles can be achieved.

In the example of FIG. 1, the upper electrode 16C' of the double-electrode assembly is substantially planar (i.e., perpendicular to the optical axis 24). As indicated above, both electrodes of the double-electrode configuration may be conically shaped.

It is noted that the lens arrangement can include other lenses and components than lens arrangement 10 of FIG. 1. For example it does not need to have both an electrostatic and a magnetic lens, it can have lenses shaped and positioned in a different manner than the lenses of FIG. 1, and the like.

Figure 2:
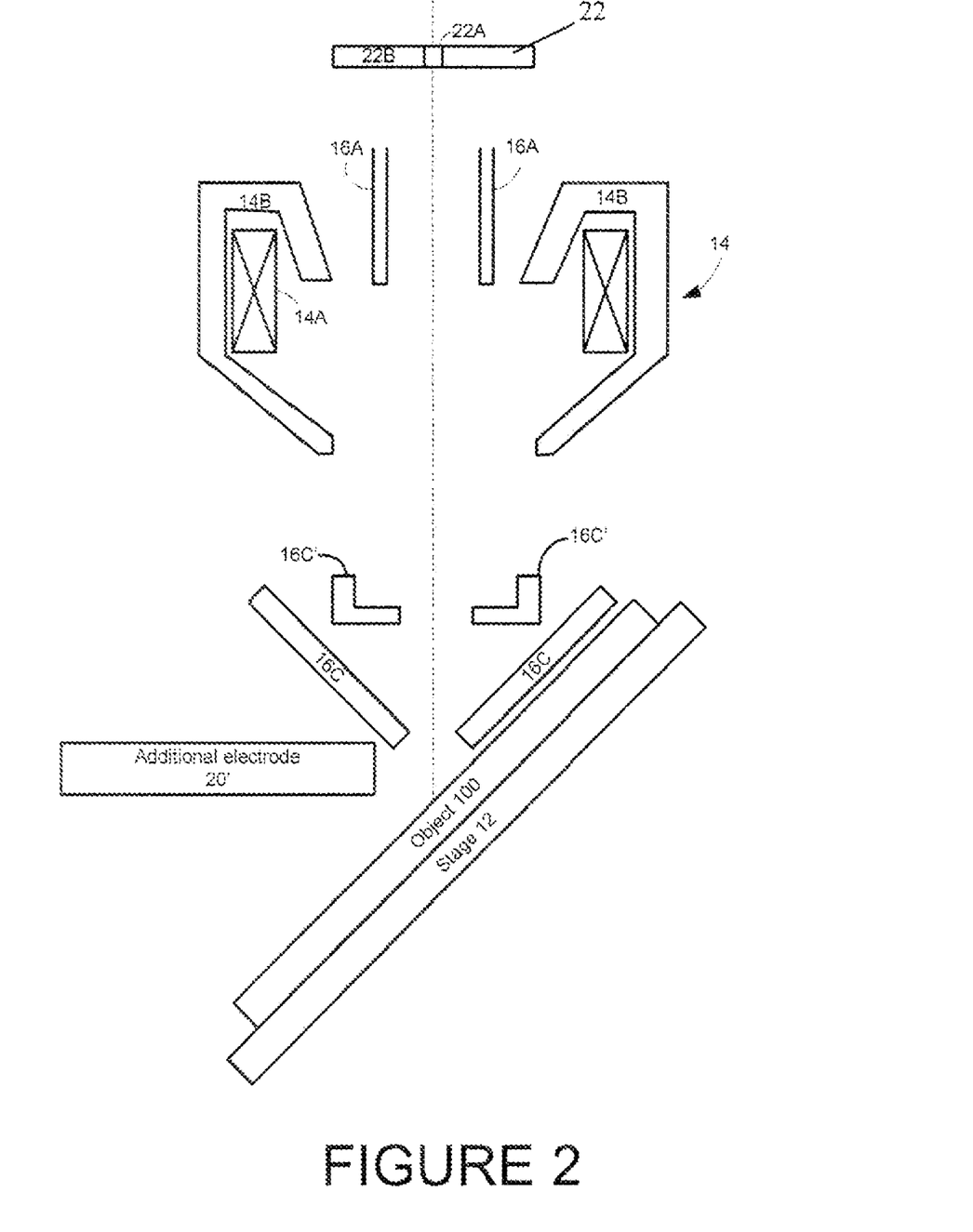
FIG. 2 illustrates a lens arrangement and an additional electrode, according to another embodiment of the invention.

FIG. 2 illustrates a lens arrangement 10 and an additional electrode 20', according to another embodiment of the invention. The additional electrode 20' is substantially horizontal, while additional electrode 20 of FIG. 1 was oriented with respect to an imaginary horizon.

Figure 3:
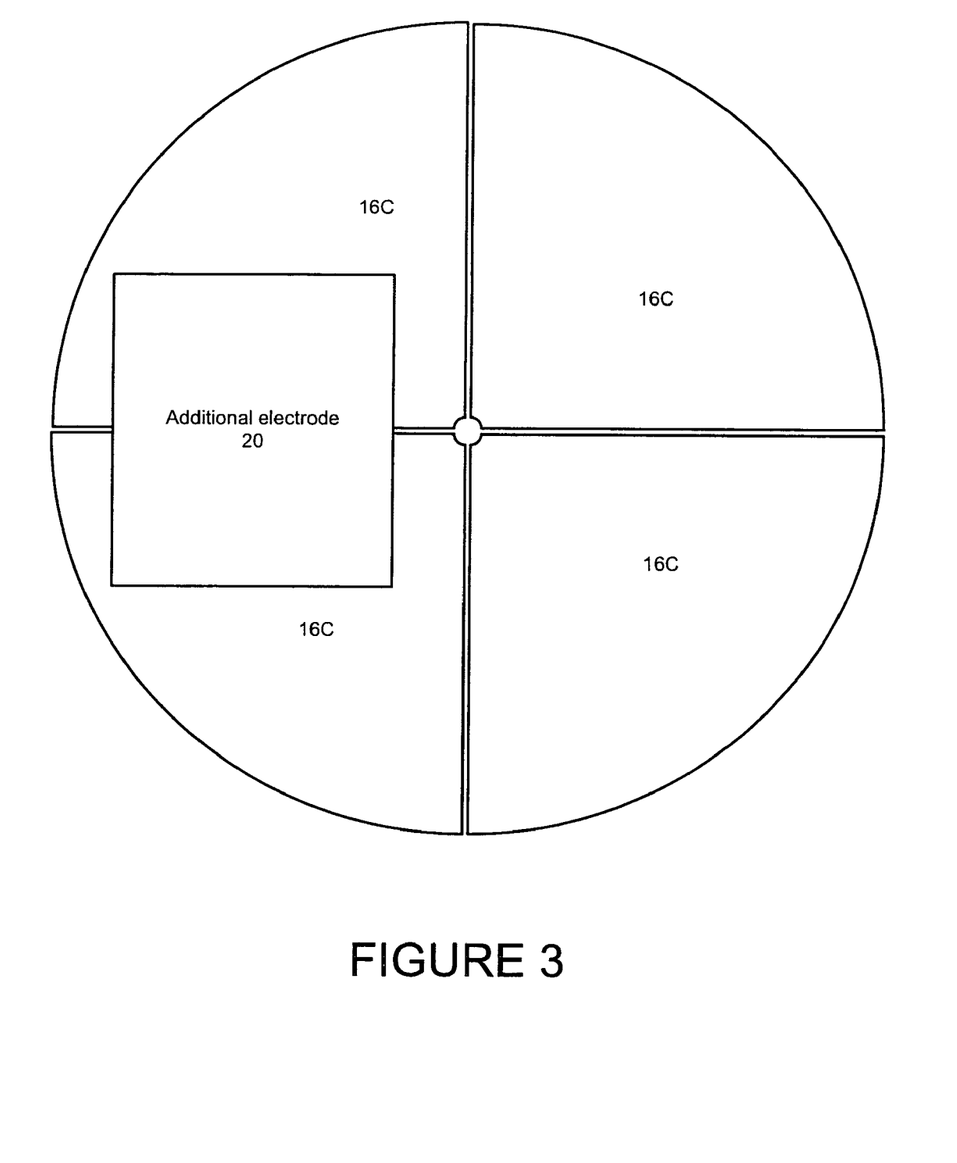
FIG. 3 illustrates an electrode of the lens arrangement and an additional electrodes according to an embodiment of the invention.

FIG. 3 illustrates an electrode 16C of lens arrangement 10 and an additional electrode 20 according to an embodiment of the invention. FIG. 3 illustrates a four part electrode 16C that define a central opening that allows PB 30 to pass through. It is assumed that the upper side of the object 100 is positioned on the right side of electrode 16C. The additional electrode 20 is positioned beneath electrode 16C such as to affect the electromagnetic field near the interaction point between PB 30 and the titled object 100. The electrostatic field near said point is symmetrical in relation to a first imaginary plane. Thus, assuming that the interaction point is within the opening, the electrostatic field at the left side of said plane is substantially equal to the field at the right side of the first field.

Figure 4:
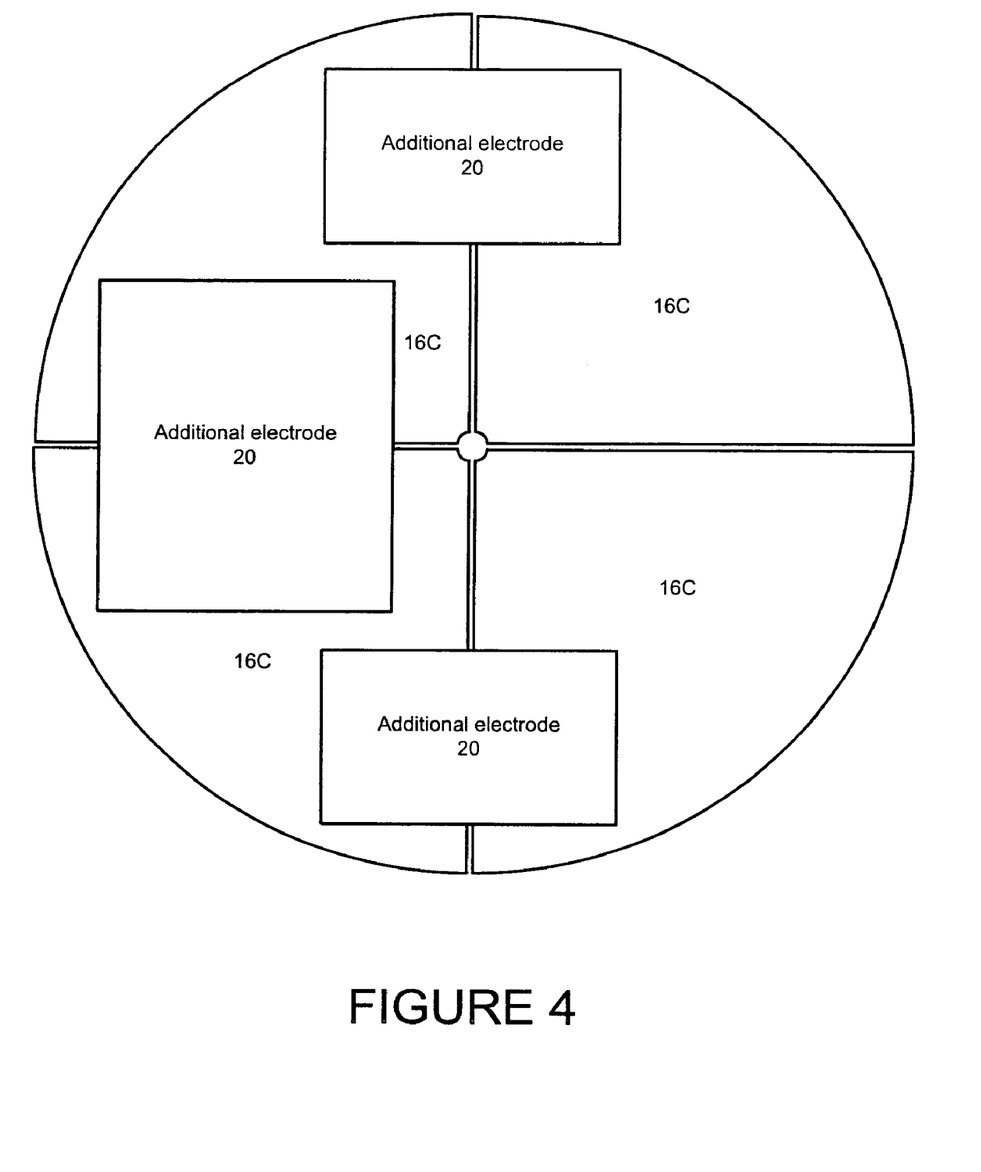
FIG. 4 illustrates an electrode of the lens arrangement and multiple additional electrodes according to an embodiment of the invention.

FIG. 4 illustrates electrode 16C of the lens arrangement 10 and multiple additional electrodes 20 according to an embodiment of the invention. These multiple additional electrodes are arranged on four sides of a point, thus increasing the symmetry of the electrostatic field also in relation to a second imaginary plane.

Figure 5:
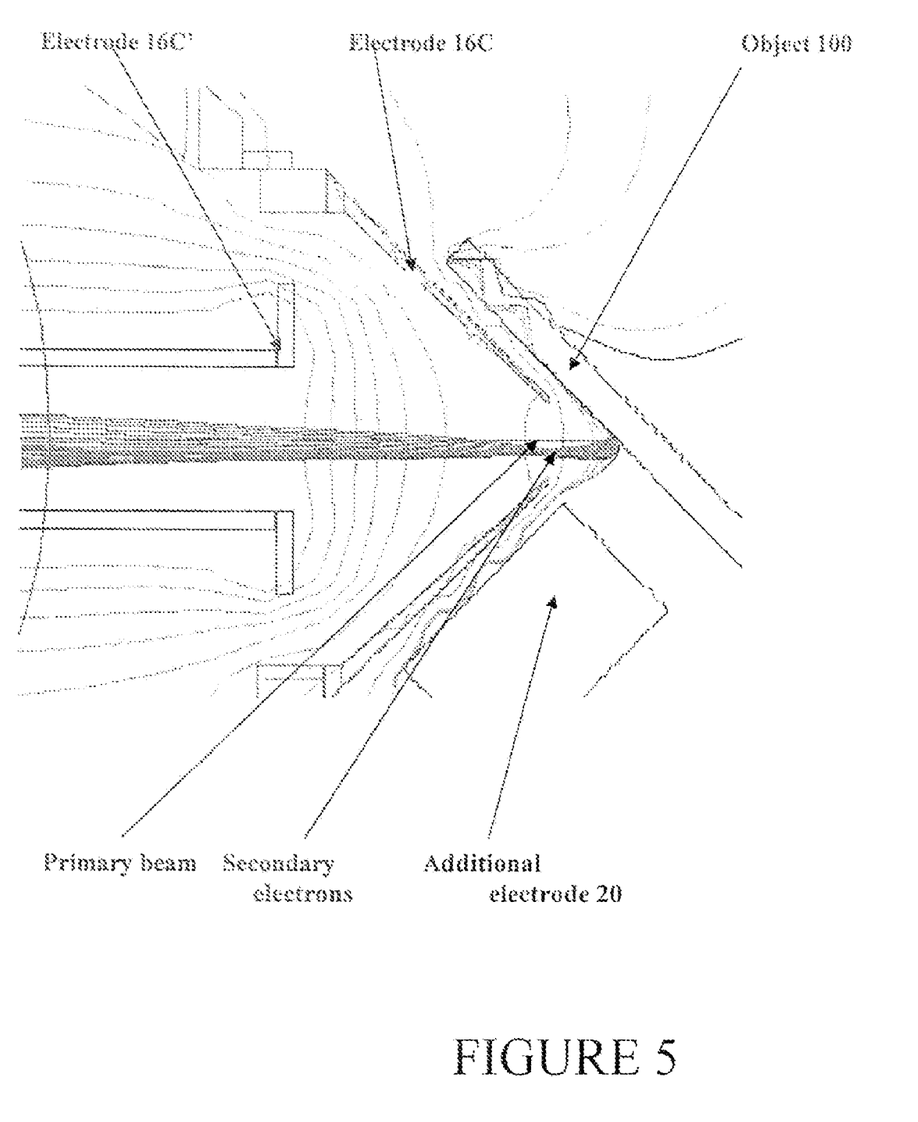
FIGS. 5 and 6 illustrate simulations of the electrostatic fields within the lens arrangement and near the object, according to an embodiment of the invention.
Figure 6:
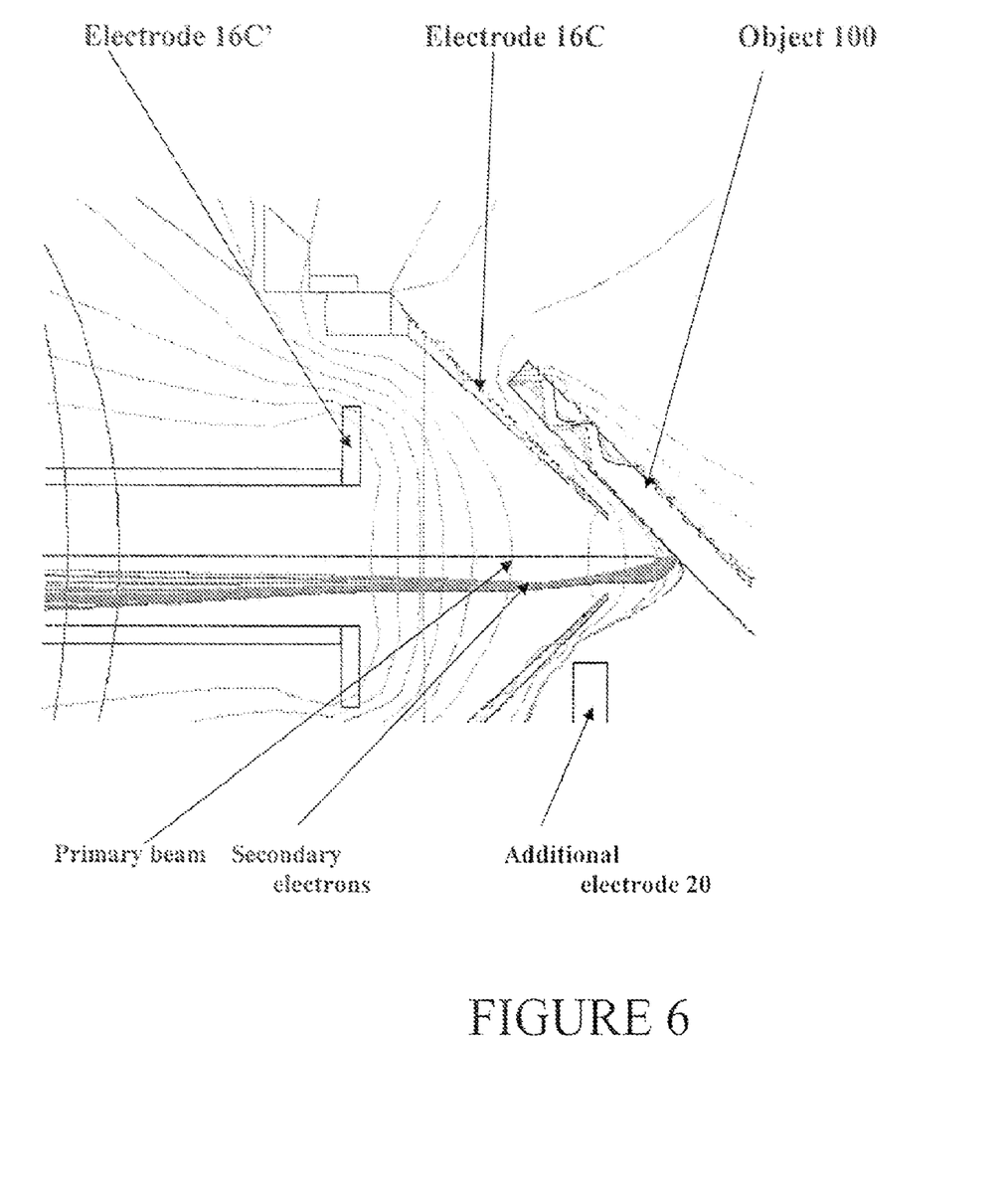

FIGS. 5 and 6 illustrate simulations of the electrostatic fields within the lens arrangement and near the object, according to an embodiment of the invention. FIG. 5 illustrates the electrostatic field (by means of equi-potential lines) generated by the lens arrangement and additional electrode 20 of FIG. 1 when various electrodes are connected to one or more voltage supply units (not shown). Electrode 16C' receives a voltage of 9000 v, electrode 16C receives a voltage of 1000 v and the additional electrode receives a voltage of −1600 v. The object is maintained at about 0 v. The figure also illustrates the primary beam and secondary electrons scattered from the object. FIG. 6 illustrates the electrostatic field (by means of equi-potential lines) generated by the lens arrangement and additional electrode 20' of FIG. 2 when electrode 16C' receives a voltage of 9000 v, electrode 16C receives a voltage of 1000 v and the additional electrode receives a voltage of −2600 v.

Figure 7:
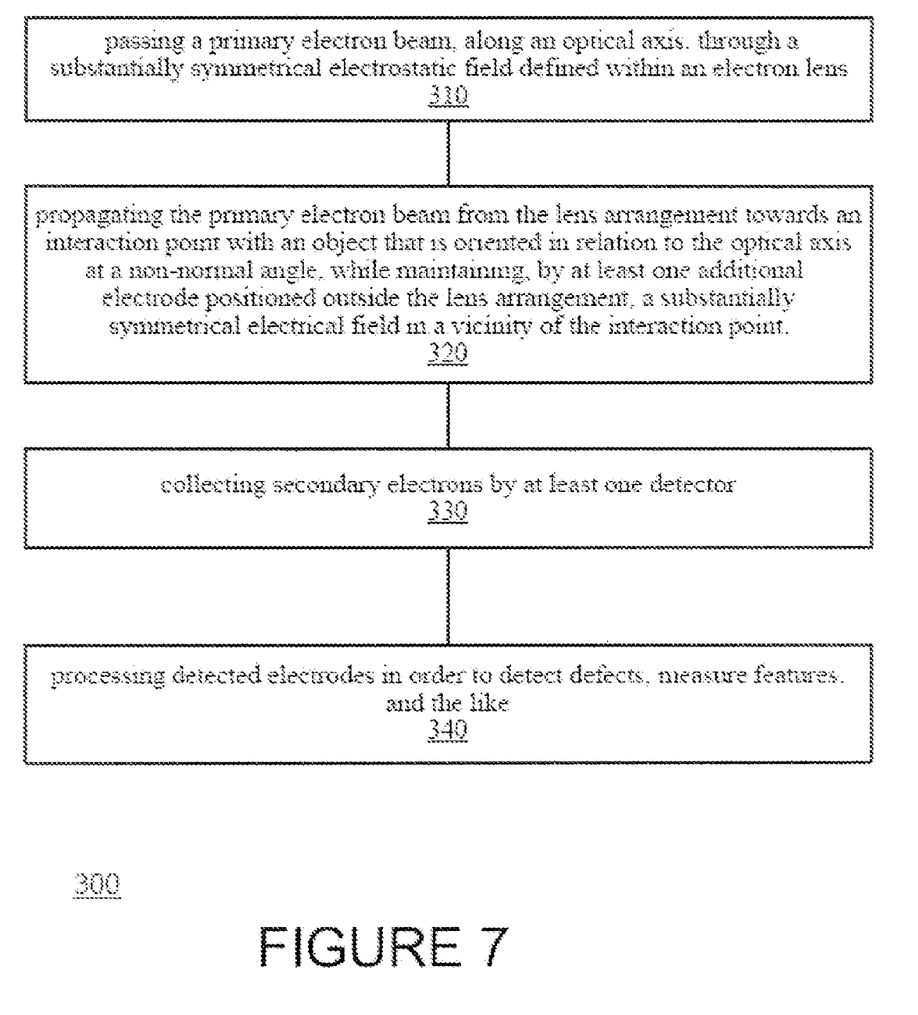
FIGS. 7 and 8 are flow charts illustrating methods for inspecting an object, according to an embodiment of the invention.

FIG. 7 is a flow chart of method 300 for inspecting an object, according to an embodiment of the invention. Method 300 starts by stage 310 of passing a primary electron beam, along an optical axis, through a substantially symmetrical electrostatic field defined within an electron lens.

Stage 310 is followed by stage 320 of propagating the primary electron beam from the lens arrangement towards an interaction point with an object that is oriented in relation to the optical axis at a non-normal angle, while maintaining, by at least one additional electrode positioned outside the lens arrangement, a substantially symmetrical electrical field in a vicinity of the interaction point.

Stage 320 is followed by stage 330 of collecting secondary electrons by at least one detector, such as in-lens detector 22.

Stage 330 is followed by stage 340 of processing detected electrodes in order to detect defects, measure features, and the like.

Conveniently, an additional electrode is oriented at a substantially opposite angle than the object, in relation to the optical axis.

Conveniently, in stage 320 maintaining a substantially symmetrical electrical field comprises maintaining at least substantial symmetry in relation to a first plane that comprises the optical axis.

Conveniently, in stage 320 maintaining a substantially symmetrical electrical field comprises maintaining at least substantial symmetry in relation to a first plane that comprises the optical axis and in relation to a second plane that is substantially perpendicular to the first plane.

Conveniently, stages 320 and 310 include providing predefined voltage levels to each additional electrode.

Figure 8:
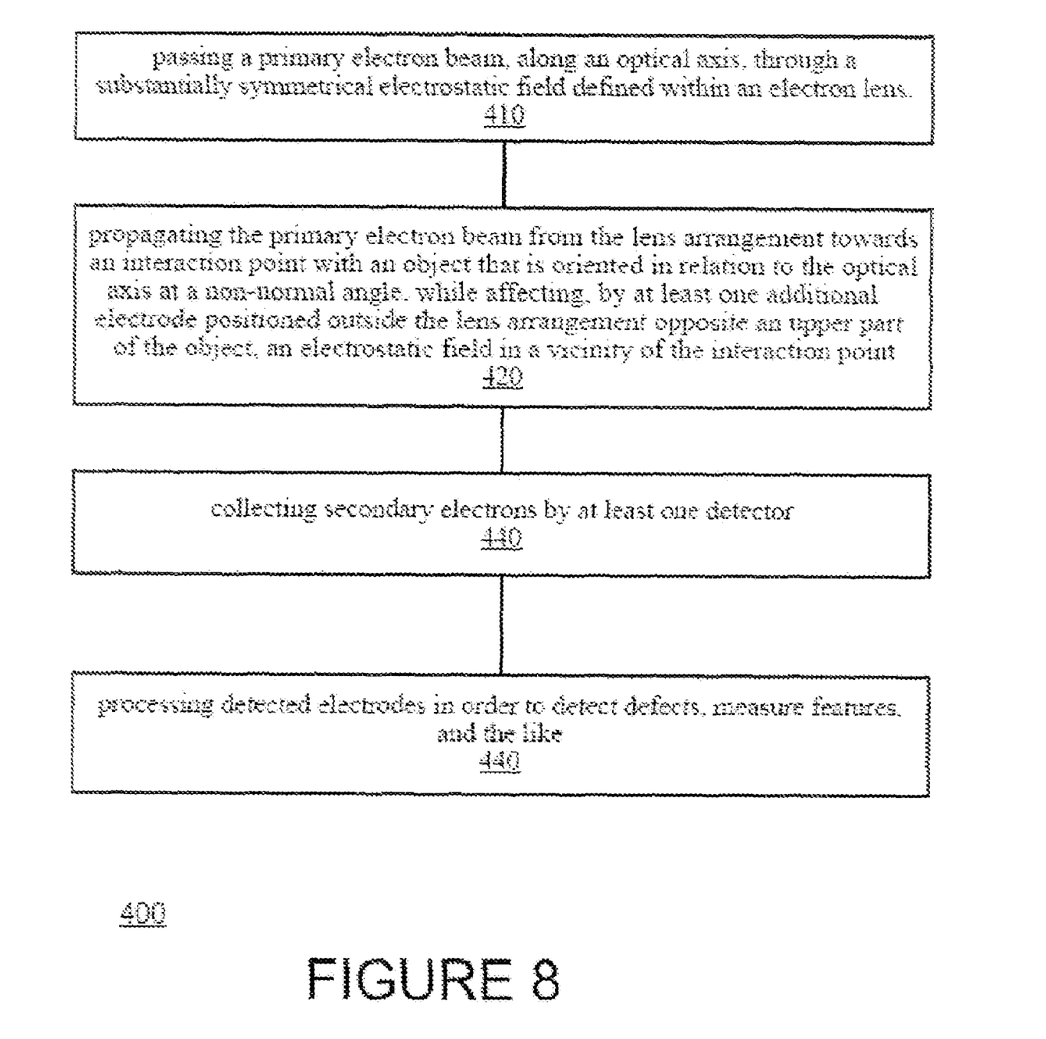

FIG. 8 is a flow chart of method 400 for inspecting an object, according to an embodiment of the invention. Method 400 starts by stage 410 of passing a primary electron beam, along an optical axis, through a substantially symmetrical electrostatic field defined within an electron lens.

Stage 410 is followed by stage 420 of propagating the primary electron beam from the lens arrangement towards an interaction point with an object that is oriented in relation to the optical axis at a non-normal angle, while affecting, by at least one additional electrode positioned outside the lens arrangement opposite an upper part of the object, an electrostatic field in a vicinity of the interaction point.

Stage 420 is followed by stage 430 of collecting secondary electrons by at least one detector, such as in-lens detector 22.

Stage 430 is followed by stage 440 of processing detected electrodes in order to detect defects, measure features, and the like.

Conveniently, affecting includes maintaining a substantially symmetrical electrostatic field in the vicinity.

Conveniently, maintaining a substantially symmetrical electrostatic field comprises maintaining at least substantial symmetry in relation to a first plane that comprises the optical axis.

Conveniently, maintaining a substantially symmetrical electrostatic field includes maintaining at least substantial symmetry in relation to a first plane that comprises the optical axis and in relation to a second plane that is substantially perpendicular to the first plane.

Conveniently, stages 410 and 420 include providing predefined voltage levels to each additional electrode.

Those skilled in the art will readily appreciate that various modifications and changes can be applied to the embodiments of the invention as hereinbefore exemplified without departing from its scope defined in and by the appended claims.

The invention claimed is:

1. An inspection system comprising:
   a lens arrangement including a magnetic lens and a multi-part electrostatic lens, and adapted to generate a substantially symmetrical electrostatic field about an optical axis and to direct a primary electron beam towards an object that is oriented in relation to the optical axis at a non-normal angle; and
   at least one additional electrode, positioned asymmetrically with respect to the optical axis and operable to increase symmetry of an electromagnetic field in a vicinity of an interaction point between the primary electron beam and the object.

2. The system of claim 1 wherein the at least one additional electrode is oriented at a substantially opposite angle than the object, in relation to the optical axis.

3. The system of claim 1 wherein the at least one additional electrode increases symmetry of the electromagnetic field in relation to a first plane parallel to the optical axis.

4. The system of claim 1 wherein the at least one additional electrode increases symmetry of the electromagnetic field in relation to a first plane parallel to the optical axis and in relation to a second plane that is substantially perpendicular to the first plane.

5. The system of claim 1 wherein the at least one additional electrode and the lens arrangement are arranged in a spaced apart coaxial relationship along the optical axis.

6. The system of claim 1 wherein each at least one additional electrode is coupled to a power source.

7. The system of claim 1 wherein the multi-part electrostatic lens of the lens arrangement comprises at least one conical-shaped electrode.

8. An inspection system comprising:
   a lens arrangement having an optical axis and including a magnetic lens and a multi-part electrostatic lens, the lens arrangement adapted to direct a primary electron beam towards an object that is oriented at an angle with respect to a plane orthogonal to the optical axis; and
   at least one additional electrode, positioned asymmetrically with respect to the optical axis and opposite an upper part of the object.

9. The inspection system of claim 8 wherein the additional electrode is oriented at an angle with respect to the object.

10. The system of claim 8 wherein the at least one additional electrode increases symmetry in relation to a first plane parallel to the optical axis.

11. The system of claim 8 wherein the at least one additional electrode increases symmetry in relation to a first plane parallel to the optical axis and in relation to a second plane that is substantially perpendicular to the first plane.

12. The system of claim 8 wherein the at least one additional electrode and the lens arrangement are arranged in a spaced apart coaxial relationship along the optical axis.

13. The system of claim 8 wherein each at least one additional electrode is coupled to a power source.

14. A method for inspecting an object, the method comprising:
   passing a primary electron beam, along an optical axis, through a substantially symmetrical electrostatic field defined within an electron lens having a magnetic lens and a multi-part electrostatic lens; and
   propagating the primary electron beam from the lens arrangement towards an interaction point with an object that is oriented at a non-normal angle in relation to the optical axis, while maintaining, by at least one additional electrode positioned asymmetrically with respect to the optical axis, a substantially symmetrical electrical field in a vicinity of the interaction point.

15. The method of claim 14 wherein maintaining a substantially symmetrical electrical field comprises maintaining at least substantial symmetry in relation to a first plane parallel to the optical axis.

16. The method of claim 14 wherein maintaining a substantially symmetrical electrical field comprises maintaining at least substantial symmetry in relation to a first plane parallel to the optical axis and in relation to a second plane that is substantially perpendicular to the first plane.

17. The method of claim 14 further comprising providing predefined voltage levels to each additional electrode.

18. A method for inspecting an object, the method comprising:
   passing a primary electron beam, along an optical axis, through a substantially symmetrical electrostatic field defined within an electron lens arrangement having a magnetic lens and a multi-part electrostatic lens; and
   propagating the primary electron beam from the lens arrangement towards an interaction point with an object that is oriented at an angle with respect to a plane orthogonal to the optical axis while affecting, by at least one additional electrode positioned asymmetrically with respect to the optical axis and opposite an upper part of the object, an electrostatic field at a vicinity of the interaction point.

19. The method of claim 18 wherein affecting comprises maintaining a substantially symmetrical electrostatic field in a vicinity of the interaction point.

20. The method of claim 19 wherein maintaining a substantially symmetrical electrical field comprises maintaining at least substantial symmetry in relation to a first plane parallel to the optical axis.

21. The method of claim 19 wherein maintaining a substantially symmetrical electrical field comprises maintaining at least substantial symmetry in relation to a first plane parallel to the optical axis and in relation to a second plane that is substantially perpendicular to the first plane.

22. The method of claim 18 further comprising providing predefined voltage levels to each additional electrode.

* * * * *